United States Patent Office 3,192,467
Patented June 29, 1965

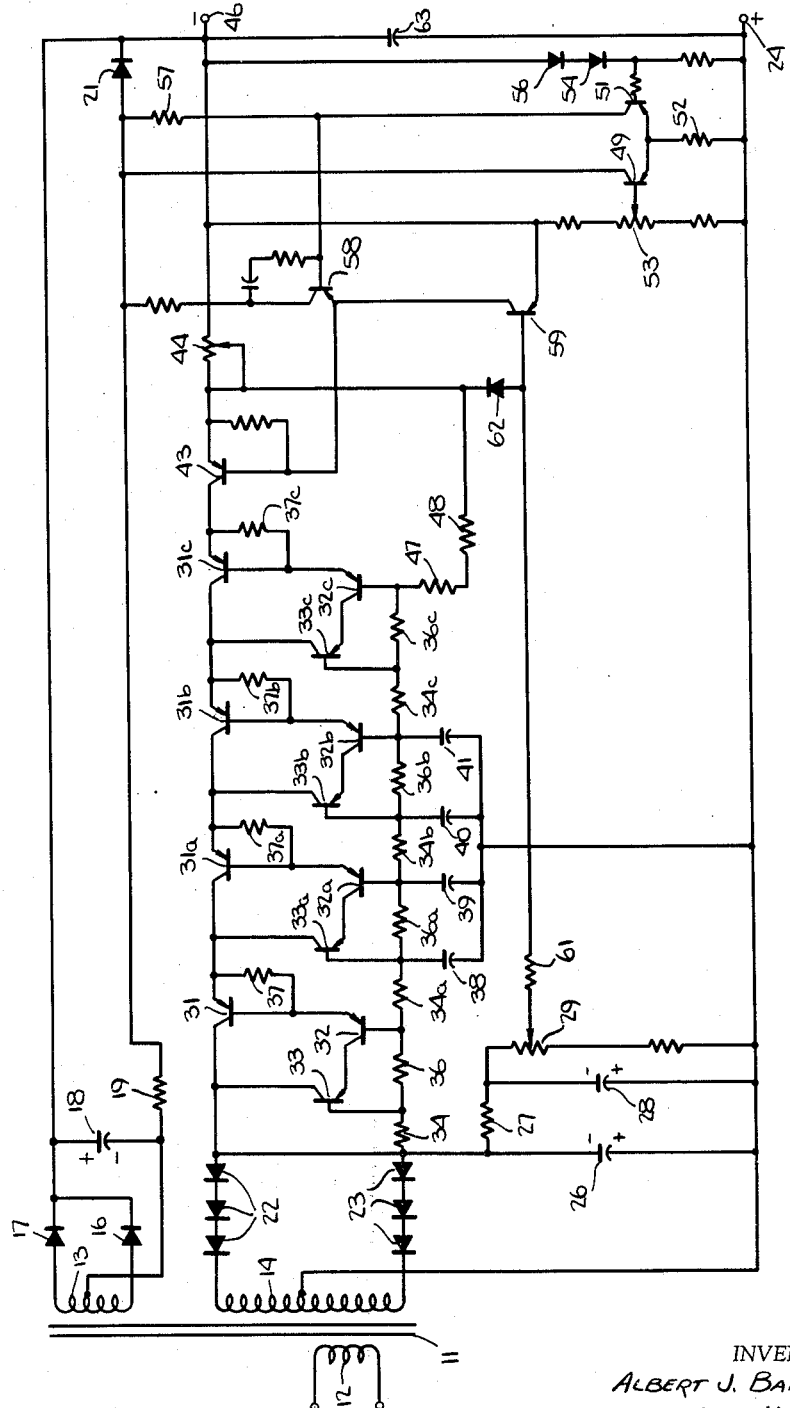

3,192,467
TRANSISTOR-REGULATED POWER SUPPLY
Albert J. Baracket, Cedar Grove, N.J., assignor to Diamond Power Specialty Corporation, Lancaster, Ohio, a corporation of Ohio
Filed Sept. 5, 1962, Ser. No. 221,460
6 Claims. (Cl. 323—22)

This invention relates to regulated power supplies and particularly to a power supply having an output voltage which is greater than the normal transistor can stand but which is regulated by a transistor circuit.

It is frequently desirable to have a power supply in which the output direct voltage is closely controlled to a specified value in the range of 200 volts or more. Such power supplies have usually been constructed with tubes in the regulating circuits, but the advantages of using transistors in all circuits are equally applicable to regulating circuits. However, it is well-known that most transistors will not stand high voltages applied between their emitter and collector terminals, and this fact has inhibited their use in such circuits.

In accordance with the present invention a relatively high voltage of the order, for example, of 275 volts is regulated by a chain of transistor subcircuits connected in series and cooperating with a final regulating circuit using transistors in which all of the electrodes are operated at elevated voltages.

The invention will be further described in connection with the drawing in which the only figure is a schematic diagram of a power supply circuit having a regulator connected according to the principles of this invention.

In the drawing the power supply has a transformer 11 with a primary 12 connected to the usual 60 cycle power lines and with two center tapped secondaries 13 and 14. Secondary 13 is connected to a full-wave rectifier comprising two diodes 16 and 17 and a simple smoothing filter consisting of a capacitor 18 and a resistor 19. The magnitude of the voltage produced by this portion of the circuit is held constant by a zener diode 21.

Secondary 13 is connected to a full-wave rectifier comprising two sets of diodes 22 and 23. The center tap of the secondary 13 is directly connected to one of the output terminals 24 of the power supply. For the sake of convenience it will be assumed in the following discussion that output terminal 24 is connected to ground although this is not necessarily the case. An electrolytic capacitor 26 reduces to some extent the ripples in the raw pulsating direct voltage produced by the full-wave rectifier diodes 22 and 23, and the ripples in this voltage are further reduced by a filter circuit comprising a resistor 27 and another electrolytic capacitor 28. A voltage divider that includes a potentiometer 29 is connected across the latter capacitor and the arm of the potentiometer is connected to the voltage regulator circuit for a purpose to be described hereinafter.

Regulation of the output voltage and further smoothing of the ripples to produce substantially ripple-free direct voltage are accomplished, in accordance with this invention, by a series circuit comprising a chain of groups of transistors connected to a voltage divider consisting of a series of resistors. The first group includes a series regulator transistor 31 having its collector connected directly to the rectifier diodes 22 and 23 to be energized by the pulsating direct current. This transistor must be capable of carrying the desired current for which the power supply is designed and may be, for example, a 2N1136B transistor which is capable of carrying more than 300 milliamperes. A second transistor 32 in the group controls the operation of transistor 31 by means of a direct connection between the emitter of transistor 32 and the base of transistor 31. A third transistor 33 has its collector connected directly to the diodes 22 and 23 and its emitter connected directly to the collector of transistor 32 so that the emitter-collector circuits of the latter two transistors are effectively connected in series. The base of transistor 33 is connected to the junction of resistors 34 and 36, which are two of the resistors in the second voltage dividing circuit and the base of the transistor 32 is connected to a junction between resistor 36 and a resistor 34a. A biasing resistor 37 is connected between the collector of transistor 31 and the base of the same transistor.

This completes the first of the groups of transistors in the series-connected section of the regulator of the power supply. Subsequent sections are indicated using the same reference numbers with the addition of suffix letters a, b, and c. It is to be understood that the invention is not limited to the specific number of regulator sections illustrated but that additional sections could be added if desired for operation at higher voltages and higher currents and for better regulation. In order to prevent oscillations bypass capacitors may be connected to the voltage divider consisting of resistors 34–34c and 36–36c. It is unnecessary to provide a bypass capacitor in each of the sections of the series regulator and in the embodiment shown bypass capacitors 38–41 are connected only between the junctions of resistors 34a and 36a, 36a and 34b, 34b and 36b, 36b and 34c, respectively, and ground.

The emitter of transistor 31c is connected to the collector of a final series regulating transistor 43 and the emitter of this transistor is connected through a small rheostat 44 to the high voltage output terminal 46. The voltage divider including resistors 34 and 36 is connected by means of resistors 47 and 48 to the emitter of transistor 43. All of the resistors 34 and 36 as well as the resistors 47 and 48 may have equal values of resistance, for example, about 200 ohms in the case of a 275 volt power supply capable of supplying 300 milliamperes.

The circuit by which transistor 43 is controlled includes a comparison circuit made up of transistor 49 and a transistor 51. The emitters of the two transistors are connected directly together and to the ground terminal 24 by way of a relatively high resistance resistor 52. The base of transistor 49 is connected to the arm of a potentiometer 53 which is connected across the output terminals of the power supply. The base of transistor 51 is connected to the high voltage terminal 46 through two zener diodes 54 and 56, the purpose of which is to maintain a fixed voltage difference between the high voltage terminal 46 and the base of the transistor terminal 51. Both the transistors 49 and 51 are energized from terminal 18 of the additional power supply, with the collector of transistor 49 connected directly to terminal 18 and the collector of transistor 51 connected through a load resistor 57 to terminal 18. Another transistor 58 also has its collector terminal connected to the power supply terminal 18 and its base connected to the collector of the transistor 51 to be actuated thereby. The transistor 58 is connected as an emitter follower circuit with its emitter connected to the base of transistor 43.

An additional comparison circuit includes transistor 59 having its collector connected to the base of the transistor 43, its emitter connected directly to the high voltage terminal 46 and its base connected to a relatively high resistance resistor 61 to the arm of the potentiometer 29. A diode 62 is connected between the base of transistor 59 and the emitter of transistor 43. If desired a capacitor 63 indicated as an electrolitic capacitor may be connected directly between the power supply output terminals 24 and 46 to assist in reducing the impedance of the regulator to high frequencies.

The operation of the power supply is as follows: The chain of transistors 31 and 31e transmit substantially all of the current for which the circuit is designed to the output terminal 46. In accordance with the basic rules of power supply regulation the equivalent interval impedances of these transistors must be varied automatically in accordance with variations in the output voltage and supply voltage to maintain the output voltage constant. Assuming that the supply has been placed in operation and that the voltage at terminal 46 has the proper magnitude, for example, 275 volts, the regulator comes into operation if this voltage changes, for example, if it reduces the magnitude to −274 volts.

The operation of the power supply begins with rectification of the alternating current by means of the diodes 22 and 23 to produce pulsating direct current across the filter capacitor 26. This pulsating current is applied to one end of the voltage divider at one terminal of resistor 34 and to the collectors of resistors 31 and 33. Reduced values of pulsating voltage are present at the bases of transistors 32 and 33 from their respective connections to the voltage divider. The voltages at these bases are such as to cause both of these transistors 32 and 33 to become less conductive at positive peaks of the pulsating voltage and more conductive at negative peaks. Since the emitter-collector circuits of transistors 32 and 33 are in series, the changes in conductivity are cumulative and result in significant changes in the bias on the base of transistor 31. These changes are of such polarity as to cause transistor 31 to become less conductive, and hence to have a greater voltage drop across it, at negative peaks of the pulsating voltage and more conductive with a concomitant smaller voltage drop at positive peaks. This tends to smooth out the pulsations.

In the case of a high voltage supply, of the order of 275 volts, the raw pulsations across the capacitor 26 may easily be too high to permit a single transistor 31 to be used to smooth them out. For this reason, the present invention also contemplates using a plurality of such transistors 31–31c, each performing only a part of the necessary smoothing function. The voltage divider made up of resistors 34 and 36 and similarly numbered resistors keeps the bias voltages in any of the groups from becoming too large. In order to prevent any build-up of oscillations in this chain of regulators, capacitors 38–41 provide low impedance paths to ground for such oscillations.

The other end of the regulator may best be explained by working backward from the output terminals 24 and 46. The voltage difference between these terminals is sampled by the voltage divider that includes the potentiometer 53, and a fraction of this voltage determined by the setting of the arm of this potentiometer is applied to the base of transistor 49. This voltage is compared with a fixed voltage drop across the zener diodes 54 and 56 which is applied to the base of transistor 51, the emitter of which is directly connected to the emitter of transistor 49. Any change in the output voltage at terminals 24 and 46 is magnified by this comparison circuit and applied to the base of transistor 58. This transistor is connected as an emitter-follower to the base of transistor 43 so that as the voltage difference between terminals 24 and 46 increases, the impedance of the emitter-collector circuit of transistor 43 also increases and the voltage drop between the emitter and collector terminals of the latter transistor increases. As a result, the voltage of terminal 46 must shift to a value slightly closer to the voltage to terminal 24. Conversely, when the voltage difference between terminals 24 and 46 becomes smaller than it should be, the impedance of transistor 43 decreases and there is thus a smaller voltage drop across this transistor and a desired increase in the voltage difference between terminals 24 and 46.

The transistors at the output end of the regulator must also be protected against having excessive voltages applied between their terminals. This means that transistors 49 and 51 float at a voltage not greatly different from the voltage of terminal 46. Also in order to have as nearly perfect regulation as possible, which means taking variations in the input alternating voltage into account, a connection must be made between the source and the output regulator. This connection is made via resistor 61 to the arm of a sampling potentiometer 29 which samples the unregulated, but fairly well filtered, voltage across capacitor 28. This sampled voltage includes, of course, a sample of any changes in the input voltage from the power lines, and it is connected to the regulator via the transistor 59, the base of which is connected to resistor 61. As the voltage at the arm of potentiometer 29 becomes more negative, the voltage at the collector of transistor 43 also becomes more negative and if the voltage drop across this transistor remained constant, the voltage of terminal 46 would become more negative with respect to the voltage of terminal 24. However, the increasingly negative voltage at the arm of potentiometer 29 is applied to the base of transistor 59 which causes its collector to become less negative and thus to bias the base of transistor 43 in such a way as to increase the voltage drop between the collector and emitter thereof, thereby holding terminal 46 at or close to its original voltage. In order to keep the base of transistor 59 from going too positive, the diode 62 is connected so as to conduct whenever the base of transistor 59 is positive with respect to the emitter of transistor 43, thus helping to keep all of the transistors operating at voltages not differing greatly from the voltage of terminal 46.

While this regulator has been described in terms of a specific embodiment, it will be appreciated by those skilled in the art that the true scope is not so limited but is determined by the following claims.

What is claimed is:

1. A transistor-regulated power supply comprising: a rectifier circuit; a first series regulator transistor having its collector and emitter connected in series with said rectifier circuit; a voltage divider comprising a plurality of resistors connected in parallel with the collector and emitter of said transistor; a second transistor having its base connected to a junction between said resistors to be actuated by voltage changes at said junction, the emitter of said second transistor being connected to the base of said first transistor to control the impedance between said emitter and collector thereof; and a third transistor having its collector connected to the collector of said first transistor to be energized by current from said rectifier circuit and having its base connected to a second junction between resistors of said voltage divider to be actuated by voltage changes at said second junction, the emitter of said third transistor being connected to the collector of said second transistor to assist in controlling the current through said second transistor to the base of said first transistor.

2. A transistor-regulated power supply comprising: a rectifier circuit; a first series regulator transistor having its collector and emitter connected in series with said rectifier circuit; a voltage divider comprising a plurality of resistors connected in parallel with the collector and emitter of said transistor; a second transistor having its base connected to a junction between said resistors to be actuated by voltage changes at said junction, the emitter of said second transistor being connected to the base of said first transistor to control the impedance between said emitter and collector thereof; a third transistor having its collector connected to the collector of said first transistor to be energized by current from said rectifier circuit and having its base connected to a second junction between resistors of said voltage divider to be actuated by voltage changes at said second junction, the emitter of said third transistor being connected to the collector of said second transistor to assist in controlling the current through said second transistor to the base of said first transistor; a pair of output terminals for said power supply; a fourth transistor having its emitter and collector connected in series with the emitter and collector of said first transistor between said first transistor and one of said output terminals; and circuit means connected to said output terminals and to the base of said fourth transistor, said circuit means comprising means for deriving a reference voltage, means for comparing a sample of the voltage between said terminals to said reference voltage, and means for controlling the impedance between the emitter and collector of said fourth transistor in accordance with the compared voltages.

3. A transistor-regulated power supply comprising: a rectifier circuit and a plurality of groups of regulator circuits connected in series with each other, each of said groups comprising a first series regulator transistor having its collector and emitter connected in series with said rectifier circuit, a voltage divider connected at one end to said rectifier circuit and comprising a plurality of series-connected resistors joined end to end at a plurality of junctions, a second transistor having its base connected to a first junction between said resistors to be actuated by voltage changes at said junction, the emitter of said second transistor being connected to the base of said first transistor to control the impedance between said emitter and collector thereof, and a third transistor having its collector connected to the collector of said first transistor to be energized by current from said rectifier circuit and having its base connected to a second junction between resistors of said voltage divider to be actuated by voltage changes at said second junction, the emitter of said third transistor being connected to the collector of said second transistor to assist in controlling the current through said second transistor to the base of said first transistor.

4. The power supply of claim 3 in which said voltage dividers are connected in series to control the operations of said series-connected groups.

5. The power supply of claim 4 comprising, in addition, a plurality of capacitors each connected in series from separate ones of said junctions to a common terminal of said rectifier circuit.

6. A transistor-regulated power supply comprising: a rectifier circuit; a first series regulator transistor having its collector and emitter connected in series with said rectifier circuit; a voltage divider comprising a plurality of resistors connected in parallel with the collector and emitter of said transistor; a second transistor having its base connected to a junction between said resistors to be actuated by voltage changes at said junction, the emitter of said second transistor being connected to the base of said first transistor to control the impedance between said emitter and collector thereof; a third transistor having its collector connected to the collector of said first transistor to be energized by current from said rectifier circuit and having its base connected to a second junction between resistors of said voltage divider to be actuated by voltage changes at said second junction, the emitter of said third transistor being connected to the collector of said second transistor to assist in controlling the current through said second transistor to the base of said first transistor; a pair of output terminals for said power supply; a fourth transistor having its emitter and collector connected in series with the emitter and collector of said first transistor between said first transistor and one of said output terminals; circuit means connected to said output terminals and to the base of said fourth transistor, said circuit means comprising means for deriving a reference voltage, means for comparing a sample of the voltage between said terminals to said reference voltage, and means for controlling the impedance between the emitter and collector of said fourth transistor in accordance with the compared voltages; a fifth transistor having its collector connected to the base of said fourth transistor to assist in controlling the conductivity thereof; and means connected to said rectifier to derive a voltage sample therefrom, said last-named means being connected to said fifth transistor to control the conductivity thereof in response to changes in voltage at said rectifier.

References Cited by the Examiner
UNITED STATES PATENTS 2,867,695 1/59 Buie _____ 330—22
3,040,238 6/62 Taddeo _____ 307—88.5 X LLOYD McCOLLUM, *Primary Examiner.*

UNITED STATES PATENT OFFICE
CERTIFICATE OF CORRECTION

Patent No. 3,192,467                     June 29, 1965

Albert J. Baracket

It is hereby certified that error appears in the above numbered patent requiring correction and that the said Letters Patent should read as corrected below.

Column 3, line 12, for "and" read -- to --; column 4, line 2, for "to" read -- of --.

Signed and sealed this 15th day of March 1966.

(SEAL)
Attest:

ERNEST W. SWIDER                     EDWARD J. BRENNER
Attesting Officer                      Commissioner of Patents